Jan. 23, 1934. J. WHYTE 1,944,831
ELECTRIC BRAKE
Filed Dec. 30, 1929  3 Sheets-Sheet 1

Inventor
John Whyte

Jan. 23, 1934.   J. WHYTE   1,944,831
ELECTRIC BRAKE
Filed Dec. 30, 1929   3 Sheets-Sheet 2
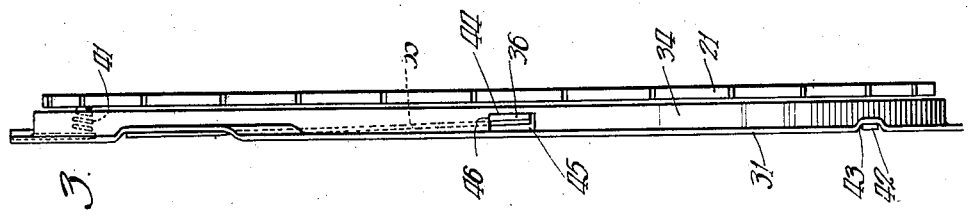
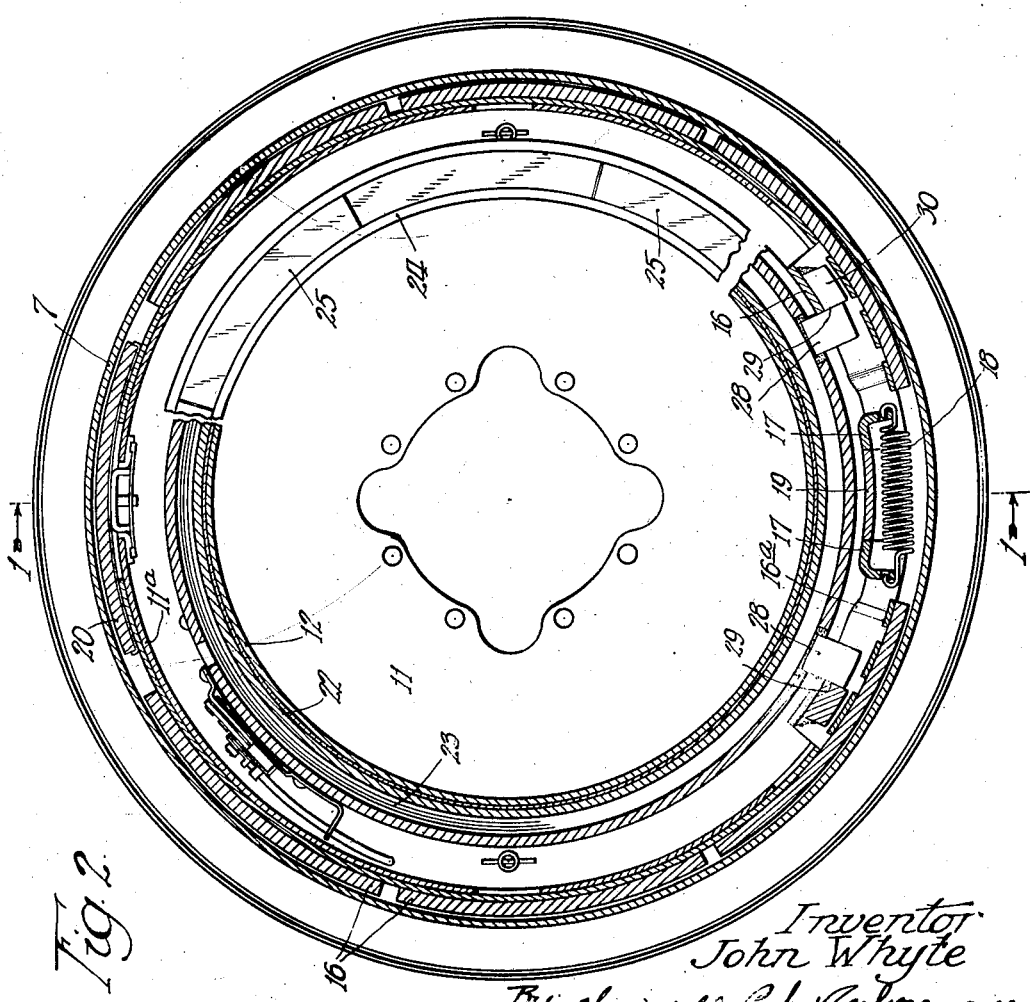

Jan. 23, 1934.   J. WHYTE   1,944,831
ELECTRIC BRAKE
Filed Dec. 30, 1929   3 Sheets-Sheet 3
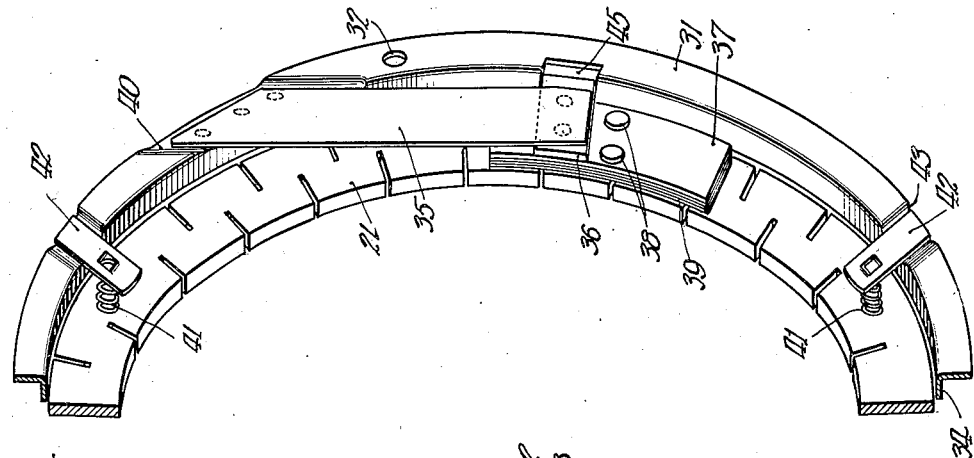
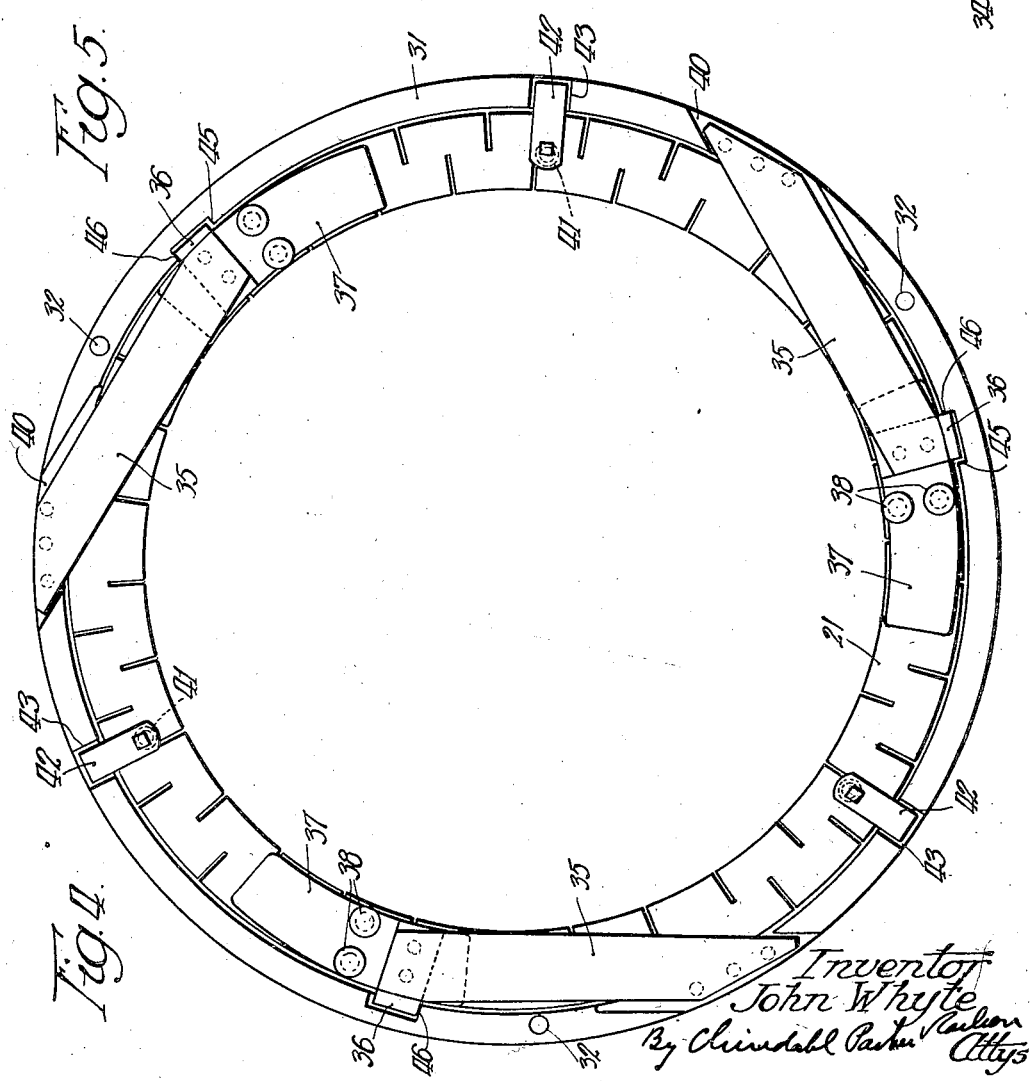
Inventor
John Whyte Patented Jan. 23, 1934

1,944,831

UNITED STATES PATENT OFFICE 1,944,831

ELECTRIC BRAKE

John Whyte, Beloit, Wis., assignor to Warner Electric Brake Corporation, South Beloit, Ill., a corporation of Illinois Application December 30, 1929
Serial No. 417,385

20 Claims. (Cl. 188—140)

This invention relates to electromagnetically controlled friction devices such as brakes and has more particular reference to the manner of mounting the annular magnetic elements commonly employed in such devices.

In adapting a magnetic friction device of the above character to a brake for use on a modern automotive vehicle, one of the magnetic rings is mounted for some degree of floating axial movement in order to allow for the inherent lateral wobbling of the vehicle wheel or other rotatable part on which one ring is carried.

The primary object of the present invention is to provide a novel means for floatingly supporting one of the magnetic elements in a device of the above general character whereby to facilitate construction and assembly of the friction device as a whole and to provide for the required accuracy in the location of such element when assembled in its intended environment.

In carrying out this object, one annular friction element, preferably the magnetic armature, is mounted for yielding axial movement on a separately formed metal ring. In the unitary structure thus formed, the friction face of the magnetic element bears a predetermined relation to the ring so that the element may be properly located in a brake assembly simply by securing said ring to the brake drum or other part on which the magnetic element is to be carried.

Another object of the invention is to provide a mounting of the above character which is particularly adapted for use with a yieldable support for the magnetic element comprising a plurality of flexible strips of metal.

Other objects and advantages of the invention will become apparent from the following detailed description taken in connection with the accompanying drawings, in which Figure 1 is a fragmentary sectional view of a vehicle wheel equipped with an electric brake embodying the features of the present invention, the section being taken along the line 1—1 of Fig. 2.

Fig. 2 is a sectional view taken substantially along the line 2—2 of Fig. 1.

Fig. 3 is an elevational view of the electromagnet armature and the supporting means therefor.

Fig. 4 is an elevational view of the magnet armature and its supporting means as viewed from the left in Fig. 3.

Fig. 5 is a fragmentary perspective view of the construction shown in Fig. 4.

Figure 1:
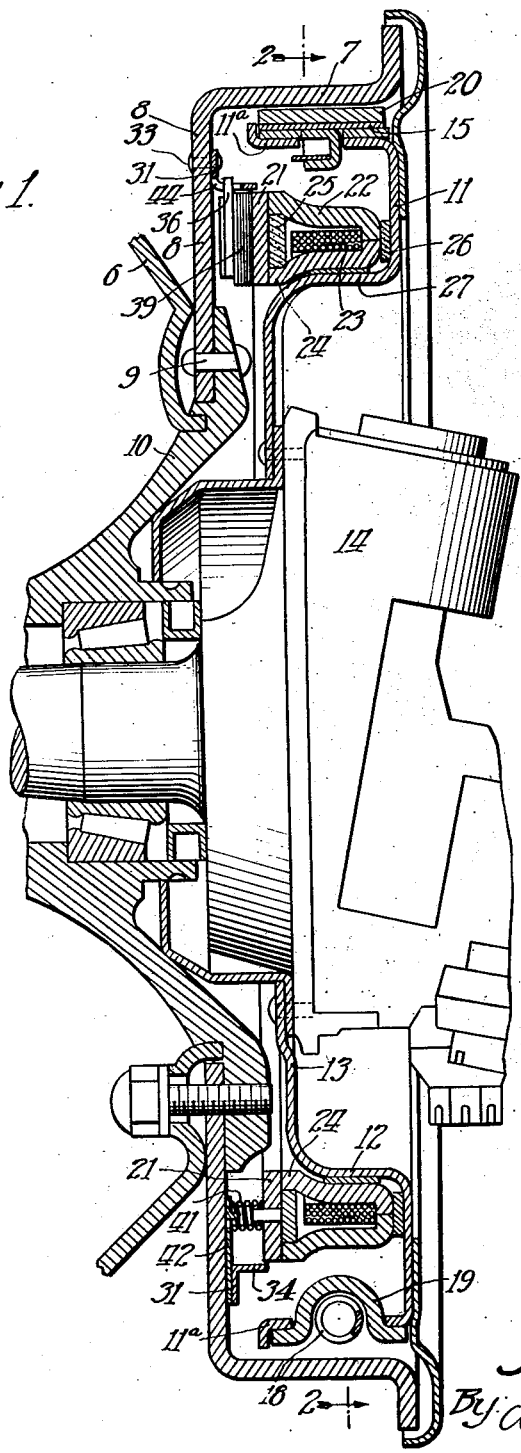

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the invention is embodied in an electric brake of the so-called momentum type adapted for a vehicle wheel 6. The rotatable friction surface of the brake is formed by a drum 7 having the usual peripheral flange 8 disposed in radial position and secured by means such as bolts 9 to the inner end of the wheel hub 10. The inwardly opening end of the drum is closed by an annular metal plate 11 having its inner edge pressed inwardly to form a cylindrical portion 12 terminating in a flange 13 which is suitably secured to the steering knuckle 14 in the case of the front wheel brake shown herein.

In the present instance, the non-rotatable friction surface of the brake is of the band type comprising a metal strip 15 encircling an inwardly projecting flange 11ª on the anchor plate 11 and having segments 16 of friction material secured to its outer surface. At its ends the strip 15 carries fittings 16ª the ends 17 of which are drawn by a spring 18 into abutting engagement with the opposite end surfaces of a stop 19 rigid with the anchor plate. For the purpose of reducing mechanical vibration of the band, a friction segment 20 may be interposed between the drum and the medial portion of the strip 15 and anchored against circumferential movement.

The operator for spreading the ends of the band apart thereby setting the brake comprises generally two rings 21 and 22 of magnetic material arranged concentric with the drum and adapted for axial gripping engagement. The ring 21 which constitutes the magnet armature is of rectangular cross-sectional shape and relatively narrow axial width. Preferably this ring is floatingly supported from the drum so as to rotate therewith at the same time being adapted for some degree of axial movement.

The ring 22 constitutes the magnet proper and is U-shaped in cross-section with a winding 23 disposed between its two concentric poles 24 which are separated by plates 25 of non-magnetic material providing a wear-resisting surface substantially flush with the pole faces and adapted to sustain the pressure between the two rings. The magnet is backed by a friction pad 26 on the inner side of the anchor plate 11 and is mounted for oscillation about the drum axis on a bearing member 27 encircling the portion 12 of the anchor plate externally thereof.

Projecting rigidly from the outer magnet pole are two actuating lugs 28 having oppositely facing surfaces 29 positioned to abut against lugs 30 which are rigid with the fittings 16. Upon movement of the magnet in either direction away from normal brake-released position (Fig. 2), one or the other of the lugs 28 will move its end of the band away from the stop 19, thereby expanding the band and pressing its entire friction surface against the drum.

Such actuation of the band takes place whenever the winding 23 is energized with the wheel in motion. The magnetic attraction thus produced causes gripping engagement between the friction surfaces of the two rings proportional to the strength of the energizing current whereupon the magnet ring will be driven frictionally by the armature ring thereby moving with the wheel a short angular distance and thus expanding the band as above described. Slippage then takes place, the magnet remaining in actuated position until the flow of current is interrupted. When this occurs, the spring 18 acting through the medium of the actuated bracket 16 and the lug 28 serves to restore the magnet as well as the actuated end of the band to brake-released position.

The mechanism thus far described constitutes an exemplary form of electric brake in which the present invention has particular utility. As herein shown the invention proper constitutes a novel mounting means for the armature ring 21 and comprises generally a metal ring 31 and a plurality of annularly arranged devices between the two rings acting to support the armature, to permit yielding axial movement thereof, and to prevent relative rotation of the armature relative to the ring 31.

The ring 31 in the form shown herein is of narrow radial width being stamped from light sheet metal stock with holes 32 formed at a plurality of annularly spaced points to receive rivets 33 or other suitable devices by which it may be rigidly secured against the flat inner surface of the drum flange 8. For a purpose which will later appear, a cylindrical flange 34 is formed around the inner peripheral edge of the ring of a diameter slightly greater than that of the armature ring 21.

In order to provide a substantially frictionless mounting for the armature, the supporting devices above referred to preferably comprise elongated flat strips 35 of flexible sheet metal extending in a direction substantially tangent to the armature ring and having their ends rigidly secured at annularly spaced points to the back of said armature. For this purpose, the end of each strip is spot welded to a bar 36 rigid with a plate 37 which is made rigid with the armature by rivets 38 extending through a stack of sheet metal laminations 39 which serve to dampen vibration of the armature.

The opposite ends of the strips 35 project beyond the outer periphery of the armature ring and are seated in depressions 40 formed in the ring 31 on the side thereof opposite the flange 34. When the strips are secured to the ring, which is preferably accomplished by spot welding, they are substantially flush with the ring surface (Fig. 3) which permits the ring to lie flat against the drum flange 8 when the armature supporting unit is assembled in the drum.

From an examination of Figs. 3, 4 and 5, it will be seen that the two rings 21 and 31 and the strips mounted as above described constitute a unitary structure in which the strips serve to support the armature ring concentric with the flange 34 and axially spaced from the ring 31. The strips allow for a considerable degree of floating axial movement by reason of their substantial length and ready flexibility and hold the two rings against relative rotation by sustaining the endwise thrust under which they are placed by a force tending to produce such relative movement. These definite relations between the two rings are established in the assembly of the unit shown in Figs. 3, 4 and 5 prior to incorporation of the unit in the drum and wheel structure. The latter operation may be effected conveniently by fastening the ring 31 to the drum flange 8. This is a simple operation especially in view of the fact that the rivet holes 32 are disposed externally of the armature ring 21.

In the assembly of the parts of the armature supporting unit, the strips 35 are first secured to the armature 21. Then with two rings supported in concentric relation, the strips are welded to the ring 31 which leaves the strips similarly stressed so that each sustains its part of the load. Since the strips lie against the side of the ring 31 opposite the flange 34 the welding electrode may be brought into proper position without interference by the other parts.

In an electric brake of the above character, it is desirable to maintain uniform reluctance of the magnetic circuit by urging their friction faces into light mechanical contact. While the resiliency of the strips 35 may be utilized for this purpose, it is preferred to employ a plurality of light compression springs 41 acting on the armature at annularly spaced points to effect axial separation of the rings 21 and 31 thereby pressing the ring 21 yieldably against the face of the magnet 22 when the brake is completely assembled as shown in Fig. 1. In the present instance, one end of each spring 41 bears against the back of the armature 21 while the other is supported on and acts against the inwardly projecting end of an arm 42 spot welded to the back side of the ring 31 in a depression 43. Axial movement of the armature under the action of the springs 41 is limited by engagement between the outer ends of the bars 36 and the edges 44 (Fig. 3) of slots 45 in the flange 34 through which the bars project.

When the magnet winding is energized with the vehicle wheel rotating in one direction, the frictional force applied to the face of the armature ring by the magnet places the strips 35 under tension. Such stresses are readily sustainable by the strips. When the magnet winding 23 is energized with the vehicle wheel rotating in the opposite direction, the strips 35 will be placed under compression which tends to cause buckling. This is effectually prevented by engagement between the bars 36 and the edges 46 (Fig. 3) of the slots 45. In normal operation, that is, when the vehicle is moving forwardly there is no appreciable frictional contact between these engageable surfaces because of the fact that the strips 35 are then under tension due to the action of the strips or the springs 41 in maintaining light mechanical contact between the friction faces.

It will be apparent that the armature ring is at all times confined within the flange 34 and held by the bars 36 against rotation relative to the ring 31 so that no damage would be done in the event that the strips 35 break or become loosened accidentally in service.

From the foregoing, it will be apparent that all of the parts contributing to the proper mounting of the armature constitute a part of or are associated with the ring 31 so that the entire mounting means for the armature can be formed and assembled independently of the brake drum or parts of the vehicle wheel. Thus, the brake of the character above described does not require a special drum construction but is capable of universal adaptation to various automobile wheel assemblies. It may be assembled and shipped in two separate units, namely the armature unit above described and the parts which are carried by the anchor plate 11. To incorporate such a brake to a particular wheel assembly, it is merely necessary for the automobile manufacturer to secure the anchor plate to a steering knuckle or rear axle housing, attach the ring 31 rigidly to the brake drum flange 8, and finally place the wheel on its axle. Such unitary construction of the armature and its supporting means permits the armature of the electric brake to be replaced conveniently by an unskilled mechanic.

No claim is made herein to features of the brake disclosed other than the mounting of the magnet ring 21, such features forming the subject matter of my copending applications Serial Nos. 320,129, filed Nov. 17, 1928, 334,886, filed Jan. 25, 1929, 393,955, filed Sept. 20, 1929, 428,870, filed Feb. 17, 1930, and a copending application of Arthur P. Warner Ser. No 428,905, filed Feb. 17, 1930.

I claim as my invention:

1. In an electric brake for a vehicle wheel, a pair of annular magnetic friction elements adapted for axial gripping engagement, non-rotatable means disposed on the inner side of said wheel and supporting one of said elements against axial movement in a direction away from said wheel, means carried by said wheel and providing a surface facing inwardly therefrom, a metal ring, and means connecting said ring and said other magnetic element and permitting yielding axial movement of the latter relative to the ring, said ring, said last mentioned element and said connecting means constituting a separately assembled unitary structure of narrow radial width adapted to be mounted on said wheel by attaching said ring to said surface, said second mentioned magnetic element being pressed yieldably against said first mentioned element when said wheel is mounted on its supporting axle.

2. In an electric friction brake, the combination of a ring of magnetic material providing a flat friction surface, a plurality of flexible metal strips disposed in substantially tangential positions relative to said magnetic ring with one of their ends secured at annularly spaced points to the back of said magnetic ring, the other ends of said strips projecting beyond one peripheral edge of the magnetic ring, and a second ring of narrow radial width having the projecting ends of said strips secured thereto at annularly spaced points, said rings and said strips constituting a unitary structure adapted to be separately assembled and to be mounted on a rotatable part of said brake by rigidly securing said second ring to such part.

3. In an electric friction brake, means for supporting a magnetic friction ring in a predetermined position relative to the drum of the brake, said supporting means comprising a second ring, and a plurality of elongated members disposed in substantially tangential position relative to said rings and having their opposite ends secured respectively to said friction ring and said second ring so as to support said friction ring for floating axial movement relative to said second ring, said rings and said members constituting a unitary structure adapted to be separately assembled and to be mounted on said drum by rigidly attaching said second ring thereto.

4. The combination of a ring of magnetic material providing a substantially flat friction surface, a flat metal ring of narrow radial width axially spaced from said magnetic ring and a plurality of flexible metal strips arranged in annularly spaced relation and each having one end secured to the side of said magnetic ring opposite said surface, and the other end being secured to said second ring on the side thereof remote from said magnetic ring.

5. In a brake for a vehicle wheel, the combination of a member rotatable with said wheel and having a substantially flat and radially disposed surface, a magnetic friction ring, a second metal ring, and means connecting said rings at a plurality of annularly spaced points and supporting said friction ring for floating axial movement relative to said second ring, said rings and connecting means constituting a unitary structure adapted to be mounted on said rotatable member by securing said second ring against said radial surface whereby to support the friction face of said magnetic element in predetermined position relative to said surface.

6. In an electric friction brake, the combination of a rotatable drum having a peripheral flange with a surface facing toward the open end of said drum, an annular magnetic armature, an integral member adapted to extend around said drum flange and means connecting said armature and member at annularly spaced points and supporting said armature for yielding axial movement relative to said member, said armature being assembled on said drum for floating axial movement by securing said member rigidly to said drum flange.

7. In an electric friction brake, the combination of a rotatable drum, an annular element of magnetic material providing a friction face, a metal ring formed separate from said drum and adapted to be attached rigidly thereto, a plurality of flexible metal strips having their opposite ends secured respectively to said element and said ring, said strips supporting said element in proper axial position and for floating axial movement relative to said ring and acting to sustain as an endwise thrust the torque resulting from the application of a frictional force to the face of said element, and means on said element adapted to engage an abutment on said ring and thereby prevent buckling of said strips when the latter are placed under compression.

8. In an electric friction brake having a pair of annular magnetic elements, the combination of a member rotatable with a part to be braked and means for supporting one of said elements on said member for axial floating movement and for frictional gripping engagement with the other element, a metal ring for narrow radial width, and a plurality of annularly spaced yieldable devices connecting said floating element and said ring and supporting the element against rotation relative to the ring, said floating element, said devices and said ring constituting a unitary structure by which the friction face of the element may be mounted in predetermined position relative to said member by rigidly attaching said ring thereto.

9. In an electric friction brake for a vehicle wheel, the combination of a member rotatable with a part to be braked, an annular friction element, a metal ring, a plurality of flexible metal strips having their opposite ends attached to said element and said ring so as to support the element for floating axial movement relative to the ring, the friction face of said element being supported in proper position relative to the member when said ring is rigidly secured to the member, and a pair of interengageable abutments on said ring and said element acting independently of said strips to prevent relative angular movement between said rings and said element in either direction.

10. In an electric friction brake for a vehicle wheel, the combination of a member rotatable with a part to be braked, an annular friction element, a metal ring, a plurality of flexible metal strips having their opposite ends attached to said element and said ring so as to support the element for floating axial movement relative to the ring, the friction face of said element being supported in proper position relative to the member when said ring is rigidly secured to the member, means rigid with said ring and providing an abutting surface extending parallel to the axis of said element, and means rigid with said element adapted to engage said abutting surface when said strips are placed under compression whereby to prevent relative angular movement of the element and ring by buckling of said strips at the same time allowing for axial movement of the element during such engagement.

11. In an electric friction brake for a vehicle wheel, the combination of a part rotatable with said wheel, an annular friction element, a metal ring, a plurality of elongated members having their opposite ends attached to said element and said ring so as to support the element for floating axial movement relative to the ring, the friction face of said element being supported in proper position relative to said rotatable part when said ring is rigidly secured thereto, and spring means interposed between said ring and said element and acting to urge said element axially away from said ring.

12. In an electric friction brake for a vehicle wheel, the combination of a member rotatable with a part to be braked, an annular friction element, a metal ring, a plurality of flexible metal strips having their opposite ends attached to said element and said ring so as to support the element for floating axial movement relative to the ring, the friction face of said element being supported in proper position relative to the member when said ring is rigidly secured to the member, and means acting to limit the extent of axial movement of said element in a direction away from said ring.

13. In an electric friction brake, the combination of a member rotatable with a part to be braked, an annular magnetic element having a flat friction face and means supporting said element concentric with the rotational axis of said member and for floating bodily movement along said axis comprising a metal ring of a diameter slightly different from that of said element, a plurality of flexible strips secured at opposite ends to said element and ring, a flange on said ring adjacent and overlying one peripheral edge of said element, and means on said element projecting through said flange and coacting with the flange to prevent relative angular movement between said ring and said element and to limit the extent of axial movement of said element away from said ring.

14. In an electric friction brake, the combination of a member rotatable with a part to be braked, an annular magnetic element having a flat friction face and means supporting said element concentric with the rotational axis of said member and for floating bodily movement along said axis comprising a metal ring of a diameter slightly different from that of said element and of narrow radial width, and a plurality of yieldable connecting means between said element and said ring, said ring being perforated at a plurality of annularly spaced points to receive devices for securing the ring rigidly to said rotatable member.

15. In an electric friction brake, means for supporting an annular magnetic element on the drum of said brake for bodily floating movement along the axis thereof including a flexible strip having one end attached to said element, a member attached to the other end of said strip and extending along said element, the member, the strip and said element constituting a unitary structure adapted to be separately assembled and mounted on said drum by rigidly securing the member thereto.

16. In an electric friction brake, a rotatable drum, an annular magnetic element, means supporting said element for rotation with said drum and for floating axial movement, and a normally ineffective guard acting independently of said supporting means to hold said element and drum in substantially concentric relation in the event of breakage of said supporting means.

17. In an electric friction brake, the combination of a rotatable drum, an annular element of magnetic material providing a friction face, a plurality of flexible metal strips extending substantially tangentially of said element and having one of their ends secured to said element at annularly spaced points around the element, the other ends of said elements being secured to said drum whereby the element is supported by said strips for floating movement axially of the drum, and two pairs of stop surfaces on said drum and element arranged to act independently of said strips to positively limit the angular movement of said element relative to the drum, both pairs of said surfaces being normally out of frictional engagement and the surfaces which become engaged to prevent buckling of said strips under compression being spaced closer together than the other pair of surfaces.

18. In an electric friction brake, the combination of a rotatable drum, an annular element of magnetic material providing a friction face, a plurality of flexible metal strips extending substantially tangentially of said element and having one of their ends secured to said element at annularly spaced points around the element, the other ends of said elements being secured to said drum whereby the element is supported by said strips for floating movement axially of the drum, and cooperating stop surfaces carried by said element and said drum and normally disposed slightly out of contacting engagement when said strips are under tension and adapted to come into engagement as soon as said strips are placed under compression.

19. In an electric friction brake, the combination of a member rotatable with a part to be braked, an annular magnetic element carrying an energizing winding, a second magnetic element constituting the armature for said magnet and having a friction face adapted for gripping engagement therewith, a plurality of elongated flat metal strips arranged about one of said elements in substantially tangential positions each with one end secured to said element and the other end secured to said member whereby to support the element for a limited degree of floating axial movement, the friction faces of said elements being maintained in light mechanical contact when said winding is deenergized, and a pair of stop surfaces on said member and said floating element adapted to become engaged when said strips are under compression whereby to prevent buckling of the strips, said surfaces being held out of frictional contact by the tension under which said strips are maintained due to said mechanical contact between the elements.

20. The method of mounting an annular magnetic member on an annular supporting member through the medium of a plurality of elongated metal strips, said method comprising securing the ends of said strips at annularly spaced points to one of said members with each strip extending substantially tangentially, placing the other member in contact with the other ends of said strips, and welding the latter ends and member together.

JOHN WHYTE.